(12) United States Patent
Kalra et al.

(10) Patent No.: US 11,195,303 B2
(45) Date of Patent: Dec. 7, 2021

(54) SYSTEMS AND METHODS FOR CHARACTERIZING OBJECT POSE DETECTION AND MEASUREMENT SYSTEMS

(71) Applicant: BOSTON POLARIMETRICS, INC., Palo Alto, CA (US)

(72) Inventors: Agastya Kalra, Nepean (CA); Achuta Kadambi, Los Altos Hills, CA (US); Kartik Venkataraman, San Jose, CA (US)

(73) Assignee: BOSTON POLARIMETRICS, INC., Palo Alto, CA (US)

( * ) Notice: Subject to any disclaimer, the term of this patent is extended or adjusted under 35 U.S.C. 154(b) by 0 days.

(21) Appl. No.: 17/279,339

(22) PCT Filed: Dec. 3, 2020

(86) PCT No.: PCT/US2020/063044
§ 371 (c)(1),
(2) Date: Mar. 24, 2021

(65) Prior Publication Data
US 2021/0350573 A1 Nov. 11, 2021

Related U.S. Application Data

(60) Provisional application No. 62/967,487, filed on Jan. 29, 2020.

(51) Int. Cl.
*G06K 9/00* (2006.01)
*G06T 7/73* (2017.01)
(Continued)

(52) U.S. Cl.
CPC ............... *G06T 7/75* (2017.01); *G06T 7/593* (2017.01); *G06T 19/20* (2013.01); *G06T 2219/2004* (2013.01)

(58) Field of Classification Search
CPC .... G06T 7/73; G06T 7/70; G06T 7/74; G06T 2207/30244; G06T 7/001;
(Continued)

(56) References Cited

U.S. PATENT DOCUMENTS

2002/0118893 A1* 8/2002 Nguyen ............... G06K 9/6203
382/294
2003/0095696 A1* 5/2003 Reeves ................. G06T 7/0012
382/131

(Continued)

OTHER PUBLICATIONS

International Search Report and Written Opinion for International Application No. PCT/US20/63044, dated Mar. 12, 2021, 14 pages.
(Continued)

*Primary Examiner* — Alex Kok S Liew
(74) *Attorney, Agent, or Firm* — Lewis Roca Rothgerber Christie LLP (57) ABSTRACT

A method for characterizing a pose estimation system includes: receiving, from a pose estimation system, first poses of an arrangement of objects in a first scene; receiving, from the pose estimation system, second poses of the arrangement of objects in a second scene, the second scene being a rigid transformation of the arrangement of objects of the first scene with respect to the pose estimation system; computing a coarse scene transformation between the first scene and the second scene; matching corresponding poses between the first poses and the second poses; computing a refined scene transformation between the first scene and the second scene based on coarse scene transformation, the first poses, and the second poses; transforming the first poses based on the refined scene transformation to compute transformed first poses; and computing an average rotation error and an average translation error of the pose estimation system based on differences between the transformed first poses and the second poses.

4 Claims, 6 Drawing Sheets

(51) Int. Cl.
*G06T 19/20* (2011.01)
*G06T 7/593* (2017.01)

(58) Field of Classification Search
CPC . G06T 2207/30141; G06T 2207/30148; G06T 2207/10016; G06T 2207/10028; G06T 7/0008; G06T 2207/10081; G06T 2207/20076; G06T 2209/30204; G06T 7/0006; G06T 7/0012; G06T 7/75; G06T 2207/10024; G06T 2207/30241; G06T 3/60; G06T 7/155; G06T 7/20; G06T 7/251; G06T 7/30; G06T 7/32; G06T 11/203; G06T 2200/04; G06T 2207/10004; G06T 2207/10012; G06T 2207/10088; G06T 2207/10104; G06T 2207/10108; G06T 2207/20081; G06T 2207/20164; G06K 9/00; G06K 9/6255; G06K 9/00214; G06K 9/6203; G06K 9/3216; G06K 9/00067; G06K 9/0008; G06K 9/00087; G06K 9/00201; G06K 9/00208; G06K 9/00228; G06K 9/00268
See application file for complete search history.

(56) References Cited

U.S. PATENT DOCUMENTS

2008/0144972 A1* 6/2008 Kang ............... G06K 9/6211
382/294
2011/0273442 A1 11/2011 Drost et al.
2013/0156262 A1 6/2013 Taguchi et al.
2015/0016712 A1 1/2015 Rhoads et al.
2016/0335486 A1 11/2016 Fleishman et al.
2017/0132794 A1* 5/2017 Lee .................... G06T 7/73
2020/0327692 A1* 10/2020 Lin .................... G06T 7/246
2020/0353878 A1* 11/2020 Briggs ............... G01S 7/4972

OTHER PUBLICATIONS

Sheng et al., "A Generative Model for Depth-based Robust 3D Facial Pose Tracking," Proceedings of the IEEE Conference on Computer Vision and Pattern Recognition (CVPR) [online], pp. 4488-4497, published 2017 [retrieved Jan. 28, 2021].

Fieraru et al., "Learning to Refine Human Pose Estimation," Proceedings of the IEEE Conference on Computer Vision and Pattern Recognition (CVPR) Workshops, [online], pp. 318-327, published 2018 [retrieved Jan. 28, 2021].

Fieraru et al., "Learning to Refine Human Pose Estimation," Proceedings of the IEEE Conference on Computer Vision and Pattern Recognition (CVPR) Workshops, 2018, Abstract, 2 pages.

Acuna, David et al., "Devil is in the Edges: Learning Semantic Boundaries from Noisy Annotations," (2019) In *Proceedings of the IEEE/CVF Conference on Computer Vision and Pattern Recognition* (pp. 11075-11083).

Peng, Sida et al., "PVNet: Pixel-wise Voting Network for 6DoF Pose Estimation," (2019) In *Proceedings of the IEEE/CVF Conference on Computer Vision and Pattern Recognition* (pp. 4561-4570).

* cited by examiner

SYSTEMS AND METHODS FOR CHARACTERIZING OBJECT POSE DETECTION AND MEASUREMENT SYSTEMS

CROSS-REFERENCE TO RELATED APPLICATIONS

This application is a U.S. National Phase Patent Application of International Application Number PCT/US20/63044, filed Dec. 3, 2020, which claims priority to and the benefit of U.S. Provisional Patent Application No. 62/967,487, filed in the United States Patent and Trademark Office on Jan. 29, 2020, the entire disclosure of each of which is incorporated by reference herein.

FIELD

Aspects of embodiments of the present disclosure relate to the field of sensors, in particular systems and methods for characterizing the accuracy and precision of object pose measurement systems.

BACKGROUND OF THE INVENTION

In many areas of automation, such as robotics, sensors are used to determine the physical relationship of objects in the real world. For example, robotic systems often use sensing systems to measure the locations of various physical objects in order to, for example, grasp an object that may arrive at a variety of orientations, reorient the object into a desired position, and connect the object to another object. The position and orientation of an object with respect to a reference coordinate system may be referred to as a "pose" and, in a three-dimensional coordinate system, generally includes six degrees of freedom—rotation around three axes and translation along the three axes.

SUMMARY OF THE INVENTION

Aspects of embodiments of the present disclosure relate to systems and methods for characterizing the accuracy and precision of object pose measurement systems.

According to one embodiment of the present disclosure, a method for characterizing a pose estimation system, includes: receiving, from a pose estimation system, by a characterization system including a processor and a memory, a first plurality of poses of an arrangement of objects in a first scene; receiving, from the pose estimation system, by the characterization system, a second plurality of poses of the arrangement of objects in a second scene, the second scene being a rigid transformation of the arrangement of objects of the first scene with respect to the pose estimation system; computing, by the characterization system, a coarse scene transformation between the first scene and the second scene; matching, by the characterization system, corresponding poses between the first plurality of poses and the second plurality of poses; computing, by the characterization system, a refined scene transformation between the first scene and the second scene based on coarse scene transformation, the first poses, and the second poses; transforming, by the characterization system, the first plurality of poses based on the refined scene transformation to compute a plurality of transformed first poses; and computing an average rotation error and an average translation error of the pose estimation system based on differences between the transformed first poses and the second plurality of poses.

The rigid transformation of the arrangement of objects with respect to the pose estimation system may include: a rotation of the arrangement of objects.

The arrangement of objects may be on a support platform, and the characterization system may be configured to control the support platform to rigidly transform the arrangement of objects with respect to the pose estimation system.

A fiducial, adjacent the arrangement of objects, may be imaged in the first scene, rigidly transformed with the arrangement of objects, and imaged in the second scene, and the coarse scene transformation between the first scene and the second scene may be computed based on computing a first pose of the fiducial imaged in the first scene and a second pose of the fiducial imaged in the second scene.

The matching the corresponding poses between the first plurality of poses and the second plurality of poses may be performed by: transforming the first plurality of poses in accordance with the coarse scene transformation to compute a plurality of coarsely transformed first poses; and for each coarsely transformed first pose of the first coarsely transformed first poses: identifying a second pose of the second poses closest to the coarsely transformed first pose; and determining that the transformed first pose and the second pose closest to the coarsely transformed first pose match when a distance between the coarsely transformed first pose and the second pose closest to the coarsely transformed first pose is less than a false-positive threshold distance.

The matching the corresponding poses between the first plurality of poses and the second plurality of poses may be performed by: transforming the first plurality of poses in accordance with the coarse scene transformation to compute a plurality of coarsely transformed first poses; and for each coarsely transformed first pose of the first coarsely transformed first poses: identifying a second pose of the second poses closest to the coarsely transformed first pose; identifying a type of an object corresponding to the coarsely transformed first pose and the second pose; positioning a first 3-D model of the type of the object at the coarsely transformed first pose; positioning a second 3-D model of the type of the object at the second pose; and determining that the coarsely transformed first pose and the second pose closest to the coarsely transformed first pose match when an intersection between the positioned first 3-D model and the positioned second 3-D model satisfies a false-positive threshold intersection.

The computing the refined scene transformation may include: initializing a current scene transformation based on the coarse scene transformation; computing a plurality of first poses as transformed by the current scene transformation; and updating the current scene transformation in accordance with reducing a cost function computed based on differences between the second poses and the first poses as transformed by the current scene transformation.

The average rotation error may be computed based on a sum of the rotation errors between the differences between rotational components of the transformed first poses and the second plurality of poses, and the average translation error may be computed based on a sum of the translation errors between the differences between translation components of the transformed first poses and the second plurality of poses.

The average rotation error $R_{err}$ may be computed in accordance with:

$$R_{err} = \frac{1}{n}\sum_{i} \|R((P^i_{s_1} T_{s_1 s_2})^{-1} Q^i_{s_2})\|,$$

and
wherein the average translation error $T_{err}$ may be computed in accordance with:

$$T_{err} = \frac{1}{n}\sum_i \|T((P^i_{S_1}T_{S_1S_2})^{-1}Q^i_{S_2})\|,$$

where $P_{S_1}^i$ is an i-th pose of the first poses, $Q_{S_2}^i$ is an i-th pose of the second poses, $T_{S_1S_2}$ is the refined scene transformation from the first scene $S_1$ to the second scene $S_2$, and n is the number of first poses and the number of second poses.

According to one embodiment of the present disclosure, a system for characterizing a pose estimation system, includes: a processor; and a memory storing instructions that, when executed by the processor, cause the processor to: receive, from a pose estimation system, a first plurality of poses of an arrangement of objects in a first scene; receive, from the pose estimation system, a second plurality of poses of the arrangement of objects in a second scene, the second scene being a rigid transformation of the arrangement of objects of the first scene with respect to the pose estimation system; compute a coarse scene transformation between the first scene and the second scene; match corresponding poses between the first plurality of poses and the second plurality of poses; compute a refined scene transformation between the first scene and the second scene based on coarse scene transformation, the first poses, and the second poses; transform the first plurality of poses based on the refined scene transformation to compute a plurality of transformed first poses; and compute an average rotation error and an average translation error of the pose estimation system based on differences between the transformed first poses and the second plurality of poses.

The rigid transformation of the arrangement of objects with respect to the pose estimation system may include a rotation of the arrangement of objects.

The system may further include a support platform, and the memory may further stores instructions that, when executed by the processor, cause the processor to control the support platform to rigidly transform the arrangement of objects with respect to the pose estimation system from the first scene to the second scene.

A fiducial, adjacent the arrangement of objects, may be imaged in the first scene, rigidly transformed with the arrangement of objects, and imaged in the second scene, and the coarse scene transformation between the first scene and the second scene may be computed based on computing a first pose of the fiducial imaged in the first scene and a second pose of the fiducial imaged in the second scene.

The memory may further store instructions that, when executed by the processor, cause the processor to match the corresponding poses between the first plurality of poses and the second plurality of poses by: transforming the first plurality of poses in accordance with the coarse scene transformation to compute a plurality of transformed first poses; and for each transformed first pose of the first transformed first poses: identifying a second pose of the second poses closest to the transformed first pose; and determining that the transformed first pose and the second pose closest to the transformed first pose match when a distance between the transformed first pose and the second pose closest to the transformed first pose is less than a false-positive threshold distance.

The memory may further store instructions that, when executed by the processor, cause the processor to match the corresponding poses between the first plurality of poses and the second plurality of poses by: transforming the first plurality of poses in accordance with the coarse scene transformation to compute a plurality of transformed first poses; and for each transformed first pose of the first transformed first poses: identifying a second pose of the second poses closest to the transformed first pose; identifying a type of an object corresponding to the transformed first pose and the second pose; positioning a first 3-D model of the type of the object at the transformed first pose; positioning a second 3-D model of the type of the object at the second pose; and determining that the transformed first pose and the second pose closest to the transformed first pose match when an intersection between the positioned first 3-D model and the positioned second 3-D model satisfies a false-positive threshold intersection.

The memory may further store instructions that, when executed by the processor, cause the processor to compute the refined scene transformation by: initializing a current scene transformation based on the coarse scene transformation; computing a plurality of first poses as transformed by the current scene transformation; and updating the current scene transformation in accordance with reducing a cost function computed based on differences between the second poses and the first poses as transformed by the current scene transformation.

The memory may further store instructions that, when executed by the processor, cause the processor to: compute the average rotation error based on a sum of the rotation errors between the differences between rotational components of the transformed first poses and the second plurality of poses, and compute the average translation error based on a sum of the translation errors between the differences between translation components of the transformed first poses and the second plurality of poses.

The average rotation error $R_{err}$ may be computed in accordance with:

$$R_{err} = \frac{1}{n}\sum_i \|R((P^i_{S_1}T_{S_1S_2})^{-1}Q^i_{S_2})\|,$$

and
the average translation error $T_{err}$ may be computed in accordance with:

$$T_{err} = \frac{1}{n}\sum_i \|T((P^i_{S_1}T_{S_1S_2})^{-1}Q^i_{S_2})\|,$$

where $P_{S_1}^i$ is an i-th pose of the first poses, $Q_{S_2}^i$ is an i-th pose of the second poses, $T_{S_1S_2}$ is the refined scene transformation from the first scene $S_1$ to the second scene $S_2$, and n is the number of first poses and the number of second poses.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Pose estimation generally refers to a computer vision technique for estimating or predicting the location and orientation of objects. Some forms of pose estimation refer to detecting the physical pose of a human figure, such as the position and orientation of a person's head, arms, legs, and joints. Pose estimation may also refer more generally to the position and orientation of various animate or inanimate physical objects in a scene. For example, autonomously navigating robots may maintain information regarding the physical poses of objects around them in order to avoid collisions and to predict trajectories of other moving objects. As another example, in the case of robotics for use in manufacturing, pose estimation may be used by robots to detect the position and orientation of components, such that a robot arm can approach the component from the correct angle to obtain a proper grip on the part for assembly with other components of a manufactured product (e.g., gripping the head of a screw and threading the screw into a hole, whereas gripping a screw by the tip would make it difficult to insert into a hole).

There are a variety of techniques for performing pose estimation, including three-dimensional (3D) scanners that capture depth information regarding a scene. For example, pose estimation may be performed by capturing images using stereo vision systems (e.g., based on depth from stereo), which may be active (with an active light emitter, which may emit a pattern of light or structured light). As another example, time of flight sensing may be used to measure depth of surfaces in a scene based on the time between the emission of light and the detection of its reflection. Further computer vision techniques such as instance segmentation using a convolutional neural may also be used to separate individual objects from one another, and further computer vision analysis may be performed to determine the poses of the objects with respect to one another. These various pose estimation techniques may exhibit different tradeoffs regarding, for example, accuracy, precision, latency, power consumption, and the like.

Some applications of pose estimations may require higher precision than others, and therefore different approaches to pose estimation may be better suited for different tasks, based on the design constraints of those tasks.

Generally, characterizing the error rate of a system involves computing the difference between the outputs of a system to a known true value or actual value ("ground truth"), and aggregating the differences, such as by computing a mean absolute error (MAE), a mean squared error (MSE), or a root mean square error (RMSE).

However, it is often difficult to obtain a ground truth set of poses for characterizing a pose estimation system, at least because there are few techniques for measuring the poses of objects. This is for three main reasons. First, methods for accurately estimating the pose are limited to very high resolution point clouds followed by some version of applying an iterative closest point algorithm to align the point clouds. These methods are costly and do not guarantee the accuracy required to obtain a high quality ground truth. Second, a pose must always be with respect to a specific coordinate space, and to compare two poses, they must be in the same coordinate space. Obtaining the transformation in an error-free way is non-trivial. For example, if transform between coordinate spaces is correct to 100 microns, and the application specifications require accuracy to 40 microns, there is no way for the estimated transform to be used to measure at the higher precision of 40 microns. Third, certain objects, such as small objects and transparent objects (e.g., made of glass or transparent plastic) are optically challenging to image and comparative 3-D scanning or sensing systems are not capable of obtaining get high resolution dense point clouds of these types of objects.

As such, aspects of embodiments of the present disclosure are directed to systems and methods for characterizing a pose estimation system, such as characterizing the rotational error and the translational error in the poses computed by the pose estimation system at high precision. For example, some embodiments of the present disclosure are capable of characterizing pose errors in pose estimation systems at a resolution of 30 microns (30 micrometers) and 0.3 degrees. Comparative systems operating in similar conditions are generally limited to accuracies of 300 microns or more.

Figure 1:
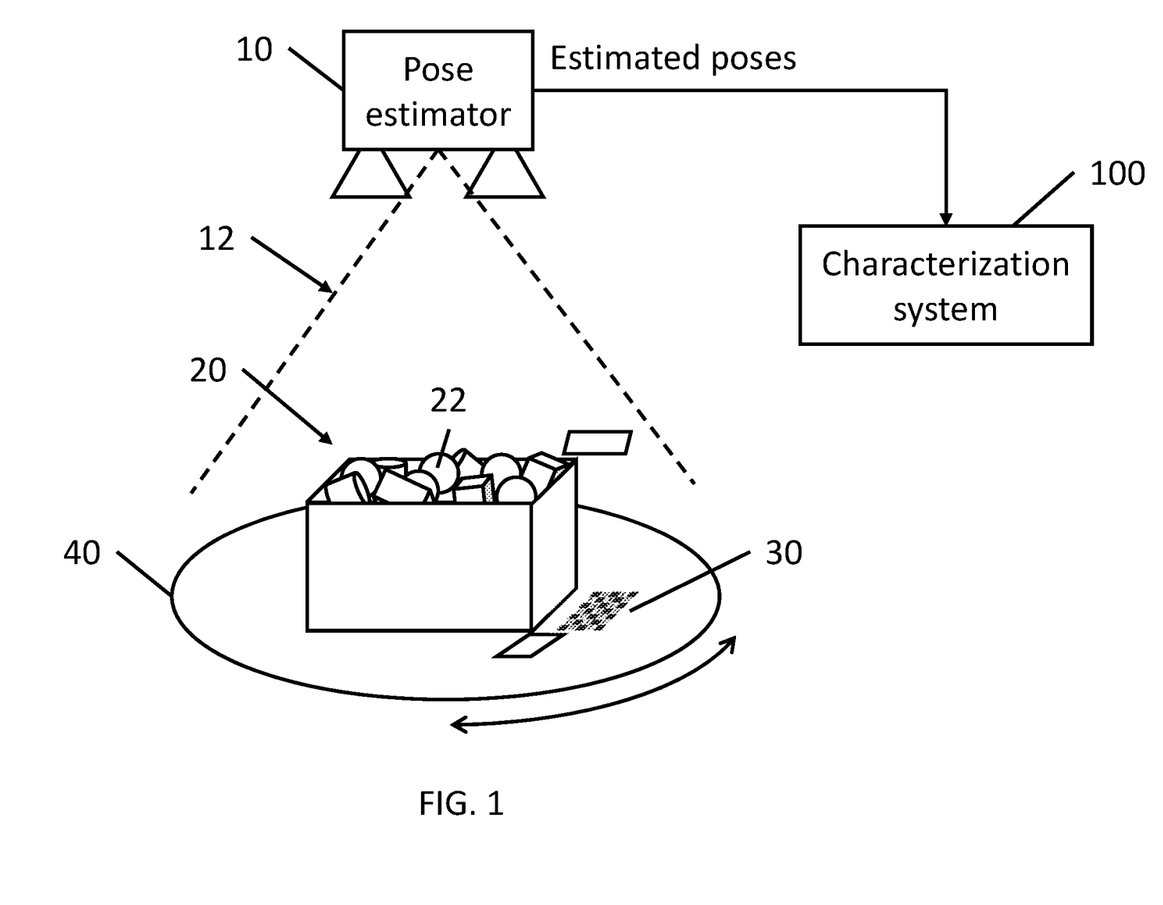
FIG. 1 is a schematic diagram depicting a characterization system according to one embodiment of the present disclosure for characterizing a pose estimation system.

FIG. 1 is a schematic diagram depicting a characterization system according to one embodiment of the present disclosure for characterizing a pose estimation system. As shown in FIG. 1, a pose estimation system 10 (or pose estimator) is arranged such that its field of view 12 captures an arrangement 20 of objects 22. In the embodiment shown in FIG. 1, the pose estimator 10 is located above the support platform 40 (e.g., spaced apart from the objects 22 along the direction of gravity), but embodiments of the present disclosure are not limited thereto—for example, the pose estimator may be arranged to have a downward angled view of the objects 22.

In some embodiments, a fiducial 30 (or marker) such as a ChArUco board (e.g., a checkerboard pattern of alternating black and white squares with ArUco fiducial markers in each of the white squares, where ArUco markers are described, for example, in Garrido-Jurado, Sergio, et al. "Automatic generation and detection of highly reliable fiducial markers under occlusion." *Pattern Recognition* 47.6 (2014): 2280-2292.) The arrangement 20 of objects 22 and the fiducial 30 may be placed on a movable support platform 40 such as a rotatable turntable.

The support platform 40 is configured to perform a physical rigid transformation of the arrangement 20 of objects 22 together with the fiducial 30 with respect to the pose estimator 10, while keeping the relative positions and orientations of the objects 22 with respect to one another and the fiducial 30 substantially fixed. For example, in the case of the use of a turntable as the movable support platform 40, the rigid transformation may be a rotation (as indicated by the arrows) around a vertical axis (e.g., an axis aligned with gravity).

A characterization system 100 according to various embodiments of the present disclosure is configured to characterize the performance of the pose estimator 10, such as predicting or calculating the average pose error (e.g., rotation error and translation error) in the estimated poses of the objects 22 computed by the pose estimator 10.

In more detail, the pose estimator 10 is configured to estimate the poses of objects detected within its field of view 12. In the embodiment shown in FIG. 1, the objects 22 are depicted abstractly as simple three-dimensional solids such as spheres, rectangular prisms, and cylinders. However, embodiments of the present disclosure are not limited thereto and characterization of pose estimators may be performed using any arbitrary object for which a pose with respect to a camera can be clearly defined.

In particular, a "pose" refers to the position and orientation of an object with respect to a reference coordinate system. For example, a reference coordinate system may be defined with the pose estimation system 10 at the origin, where the direction along the optical axis of the pose estimation system 10 (e.g., a direction through the center of its field of view 12) is defined as the z-axis of the coordinate system, and the x and y axes are defined to be perpendicular to one another and perpendicular to the z-axis. (Embodiments of the present disclosure are not limited to this particular coordinate system, and a person having ordinary skill in the art would understand that poses may be transformed between different coordinate systems.)

Each object 22 may also be associated with a corresponding coordinate system of its own, which is defined with respect to its particular shape. For example, a rectangular prism with sides of different lengths may have a canonical coordinate system defined where the x-axis is parallel to its shortest direction, z-axis is parallel to its longest direction, the y-axis is orthogonal to the x-axis and z-axis, and the origin is located at the centroid of the object 22.

Generally, in a three-dimensional coordinate system, objects 22 have six degrees of freedom—rotation around three axes (e.g., rotation around x-, y-, and z-axes) and translation along the three axes (e.g., translation along x-, y-, and z-axes). For the sake of clarity, symmetries of the objects 22 will not be discussed in detail herein, but may be addressed, for example, by identifying multiple possible poses with respect to different symmetries (e.g., in the case of selecting the positive versus negative directions of the z-axis of a right rectangular prism), or by ignoring some rotational components of the pose (e.g., a right cylinder is rotationally symmetric around its axis).

In some embodiments, it is assumed that a three-dimensional (3-D) model or computer aided design (CAD) model representing a canonical or ideal version of each type of object 22 in the arrangement of objects 20 is available. For example, in some embodiments of the present disclosure, the objects 22 are individual instances of manufactured components that have a substantially uniform appearance from one component to the next. Examples of such manufactured components include screws, bolts, nuts, connectors, and springs, as well as specialty parts such electronic circuit components (e.g., packaged integrated circuits, light emitting diodes, switches, resistors, and the like), laboratory supplies (e.g. test tubes, PCR tubes, bottles, caps, lids, pipette tips, sample plates, and the like), and manufactured parts (e.g., handles, switch caps, light bulbs, and the like). Accordingly, in these circumstances, a CAD model defining the ideal or canonical shape of any particular object 22 in the arrangement 20 may be used to define a coordinate system for the object (e.g., the coordinate system used in the representation of the CAD model).

Based on a reference coordinate system (or camera space, e.g., defined with respect to the pose estimation system) and an object coordinate system (or object space, e.g., defined with respect to one of the objects), the pose of the object may be considered to be a rigid transform (rotation and translation) from object space to camera space. The pose of object 1 in camera space 1 may be denoted as $P_{C_1}^1$, and the transform from object 1 space to camera space may be represented by the matrix:

$$\begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}$$

where the rotation submatrix R:

$$R = \begin{bmatrix} R_{11} & R_{12} & R_{13} \\ R_{21} & R_{22} & R_{23} \\ R_{31} & R_{32} & R_{33} \end{bmatrix}$$

represents rotations along the three axes from object space to camera space, and the translation submatrix T:

$$T = \begin{bmatrix} T_1 \\ T_2 \\ T_3 \end{bmatrix}$$

represents translations along the three axes from object space to camera space.

If two objects—Object A and Object B—are in the same camera C coordinate frame, then the notation $P_{CA}$ is used to indicate the pose of Object A with respect to camera C and $P_{CB}$ is used to indicate the pose of Object B with respect to camera C. For the sake of convenience, it is assumed herein that the poses of objects are represented based on the reference coordinate system, so the poses of objects A and B with respect to camera space C may be denoted $P_A$ and $P_B$, respectively.

If Object A and Object B are actually the same object, but performed during different pose estimation measurements, and a residual pose $P_{err}$ or $P_{AB}$ ($P_{AB} = P_{err}$) is used to indicate a transform from pose $P_A$ to pose $P_B$, then the following relationship should hold:

$$P_A P_{err} = P_B \tag{1}$$

and therefore $$P_{err} = P_A^{-1} P_B \tag{2}$$

Ideally, assuming the object has not moved (e.g., translated or rotated) with respect to the pose estimator 10 between the measurements of pose estimates $P_A$ and $P_B$, then $P_A$ and $P_B$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Similarly, the above would hold if the object underwent a known rigid transformation T and pose $P_B$ represented the estimated pose $P_B'$ after transforming the estimated pose back to the original scene ($P_B = P_B'T$) or, alternatively, if pose $P_A$ represented the estimated pose after applying transformation T to the estimated pose to transform it to the new scene ($P_A = P_A'T$).

Differences between the actual measured value $P_{err}$, as computed based on the estimates computed by the pose estimator 10 and the identity matrix may be considered to be errors:

$$R_{err} = \|R(P_{err})\| \quad (3)$$

$$T_{err} = \|T(P_{err})\| \quad (4)$$

where $R_{err}$ is the rotation error and $T_{err}$ is the translation error. The function R( ) converts $P_{err}$ into an axis-angle where the magnitude is the rotation difference, and the function T( ) extracts the translation component of the pose matrix.

The axis-angle representation from rotation matrix R is given by:

$$Tr(R) = 1 + 2\cos\theta \quad (5)$$

$$|\theta| = \arccos\left(\frac{Tr(R) - 1}{2}\right) \quad (6)$$

where Tr( ) denotes the matrix trace (the sum of the diagonal elements of the matrix), and θ represents the angle of rotation Accordingly, some aspects of embodiments of the present disclosure relate to applying the above pose comparison framework for characterizing a pose estimation system 10.

Figure 2:
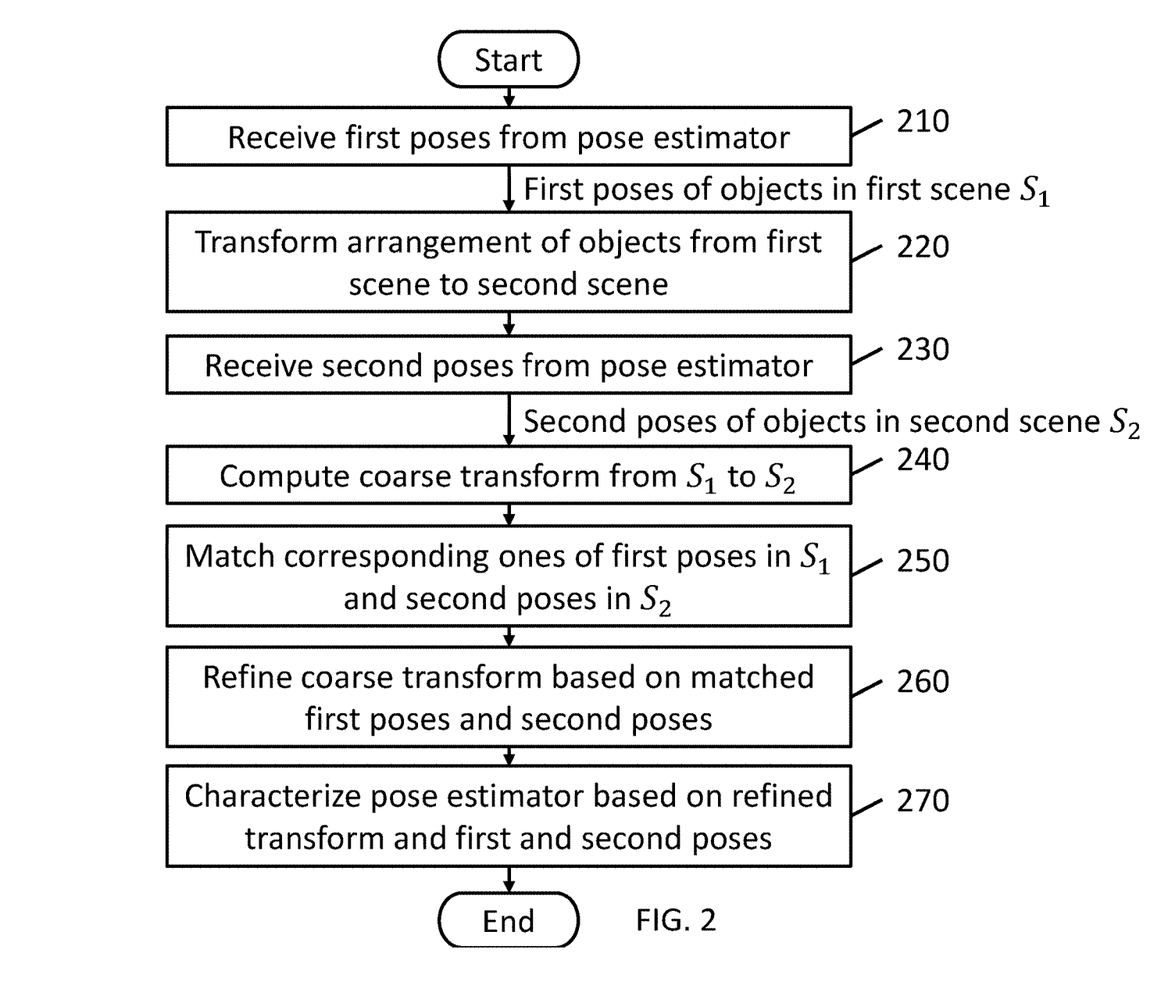
FIG. 2 is a flowchart of a method according to one embodiment of the present disclosure for characterizing a pose estimation system.

FIG. 2 is a flowchart of a method according to one embodiment of the present disclosure for characterizing a pose estimation system. In some embodiments of the present disclosure, methods in accordance with embodiments of the present disclosure are performed using a characterization system 100, which may include a computing device (e.g., a laptop computer, desktop computer, embedded system, or the like), which includes a processor and memory (e.g., dynamic random access memory and a mass storage device), where the memory stores instructions that configure the computing device to perform special-purpose operations for performing characterization of a pose estimator 10 by executing the instructions on the processor. In some embodiments, the output computed by the characterization system 100 is used to generate a report regarding the performance of the pose estimator 10, may be used to provide feedback to the pose estimator 10 (e.g., to calibrate the pose estimator 10), and/or may be supplied as input to other processes, such as for recording the performance of the pose estimator 10 with respect to a particular test.

Referring to FIG. 2, in operation 210 the characterization system 100 receives a first plurality of poses of objects 22 in an arrangement 20 of a first scene $S_1$. The poses may be denoted as $\{P_{S_1}^1, P_{S_1}^2, \ldots, P_{S_1}^i, \ldots, P_{S_1}^n\}$ in first scene $S_1$. The pose estimator 10 may compute the first poses of the objects 22 based on its particular internal techniques, which are outside of the scope of this disclosure. One example of an approach to computing pose estimates in to use depth-from-stereo to capture images of the scene from multiple angles and using block matching and disparity measurements to compute the depth of various surfaces in the scene, applying instance segmentation to segment the scene into separate instances of the various objects (e.g., separating one shape from another shape), and performing pose estimation of each instance of the objects (e.g., determining the location of the centroid and rotation of the object with respect to a reference coordinate system) by registering each instance detected in a scene with a canonical three-dimensional model of the corresponding type of object (e.g., registering an instance of a cylinder of a known shape and size to a canonical 3-D model of the cylinder, such as by applying iterative closest point, see, e.g., Arun, Somani; Thomas S. Huang; Steven D. Blostein (1987). "Least-square fitting of two 3-D point sets". *IEEE Pattern Analysis and Machine Intelligence*.).

Accordingly, the pose estimator 10 estimates a first plurality of poses of various ones of the objects 22 in the arrangement 20 of a first scene $S_1$. For example, the plurality of poses may be represented as a collection (e.g., an array) of matrices representing the rotation and translation of the individual objects from their canonical object spaces to camera space. The poses may also include information regarding the classifications of the objects (e.g., in the example shown in FIG. 1, whether each pose corresponds to the pose of a sphere, a rectangular prism, or a cylinder). In some circumstances, the pose estimator 10 may be able to compute poses for only a subset of the objects 22 in the arrangement 20, such as only the top layer of objects that are substantially not occluded by other objects (e.g., where surfaces of the object are not blocked by other objects).

In operation 220, the arrangement 20 of objects 22 is rigidly transformed to form a second scene $S_2$ based on the first scene $S_1$. In more detail, applying a rigid transformation, with respect to the pose estimator 10, to the arrangement 20 as a whole maintains the physical relationships of the objects 22 with respect to one another (e.g., without changing the physical distances between the objects 22 or the orientations of the objects with respect to one another), but changes the physical relationship of the arrangement and the pose estimator 10.

As shown in FIG. 1, the arrangement 20 of objects 22 is located on a support platform 40 that is configured to perform the rigid transformation of the arrangement 20 of objects 22 without disturbing the arrangement 20 (e.g., without substantially changing the physical relationship of the objects with respect to one another). In some embodiments, the characterization system 100 is configured to control the support platform 40 by specifying the form of the rigid transformation (e.g., translation and/or rotation of the arrangement 20). For example, the support platform 40 may include one or more motors (e.g., stepper motors) or other electronically controlled actuators for rotating and/or translating objects that are located on the support platform 40.

(In some circumstances, it may be functionally equivalent to form the second scene $S_2$ by rotating and/or translating the pose estimation system 10 in a manner that maintains the arrangement 20 of objects 22 in the field of view 12 of the pose estimation system 10.)

Figure 3:
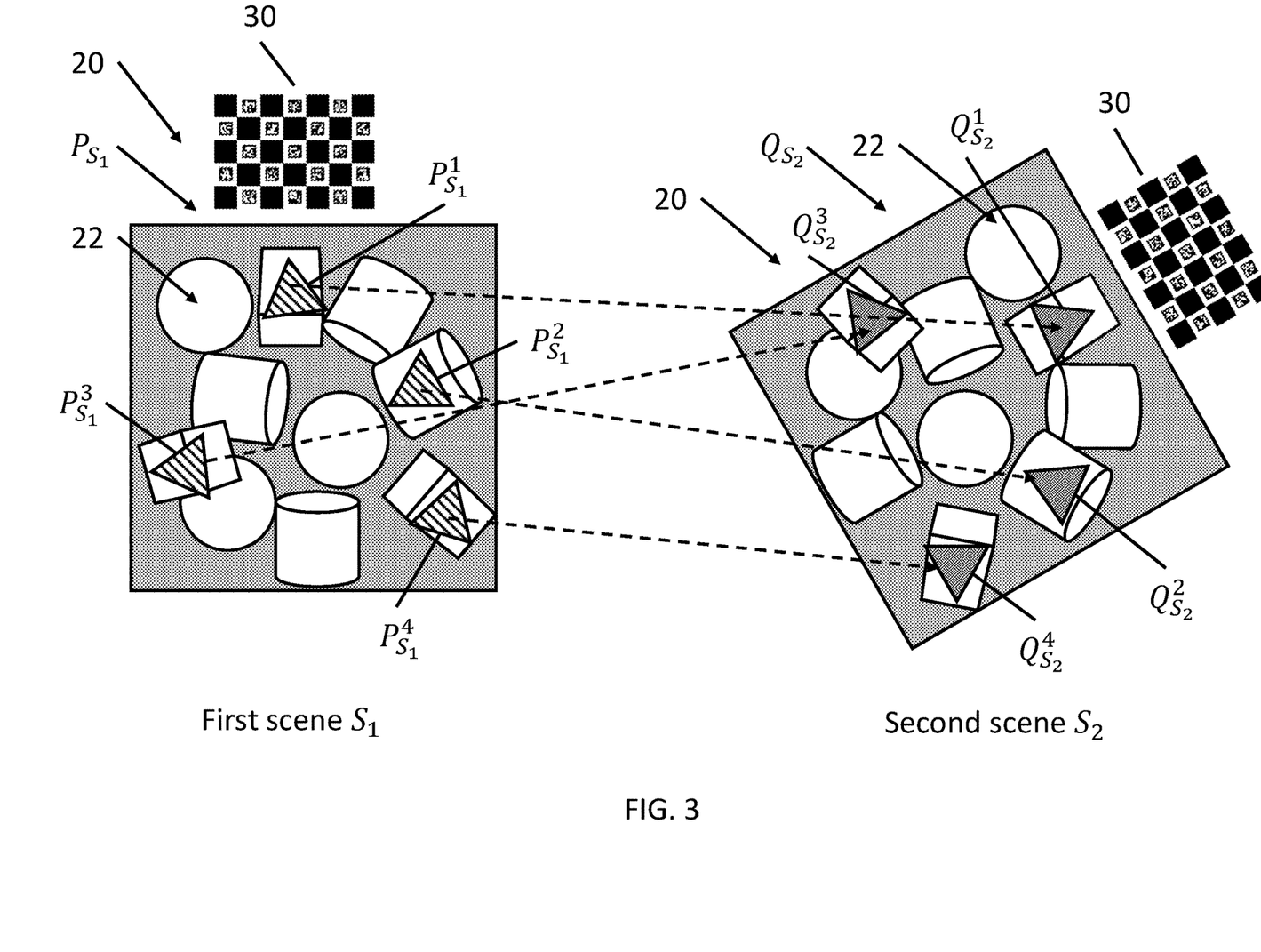
FIG. 3 is a schematic depiction of the rigid transformation of an arrangement of objects in a first scene with respect to a pose estimation system to form a second scene with respect to the pose estimation system, including depictions of the estimated poses $P_{S_1}$ of objects in the arrangement in a first scene $S_1$ and the estimated poses $Q_{S_2}$ of objects in the arrangement in a second scene $S_2$.

FIG. 3 is a schematic diagram of the rigid transformation of an arrangement of objects in a first scene $S_1$ with respect to a pose estimation system to form a second scene $S_2$ with respect to the pose estimation system. In particular, in the embodiment shown in FIG. 3, the arrangement 20 of objects 22 is located on a turntable with the centroid of the arrangement 20 located at the axis of rotation. The left side of FIG. 3 depicts a first scene $S_1$, and the right side of FIG. 3 depicts a second scene $S_2$ formed by controlling the turntable to rotate 60 degrees clockwise, thereby rigidly rotating the arrangement 20 by 60 degrees.

While FIG. 1 and FIG. 3 depict embodiments in which the support platform 40 is a turntable that rotates the arrangement 20 of objects 22 around the centroid of the arrangement 20, embodiments of the present disclosure are not limited thereto and may also include circumstances in which the support platform 40 performs both a rotation and a translation of the arrangement 20, such as by placing the arrangement 20 of objects 22 such that its centroid is not aligned with the axis of rotation of the turntable, or by using a support platform 40 that is capable of performing translations.

In operation 230, the characterization system 100 receives a second plurality of poses of the objects 22 in the arrangement 20 of a second scene $S_2$, where the second plurality of poses of the objects 22 are computed by the same pose estimation system 10 as the first plurality of poses in second scene $S_2$. The second plurality of poses may be denoted as $\{Q_{S_2}^1, Q_{S_2}^2, \ldots, Q_{S_3}^i, \ldots, Q_{S_4}^n\}$. For the purposes of this discussion, it is assumed that the first poses $P_{S_2}$ and the second poses $Q_{S_2}$ both include n poses for the same n objects. However, embodiments of the present disclosure are not limited thereto and techniques for addressing mismatches will be described below.

Given the first plurality of estimated poses $\{P_{S_1}^1, P_{S_1}^2, \ldots, P_{S_1}^i, \ldots, P_{S_1}^n\}$ of the objects in first scene $S_1$ and the second plurality of estimated poses $\{Q_{S_2}^1, Q_{S_2}^2, \ldots, Q_{S_3}^i, \ldots, Q_{S_4}^n\}$ of the same objects in second scene $S_2$, these poses can then be compared to measure the error characteristics of the pose estimator 10. However, the precise values associated with the rigid transformation $T_{S_1S_2}$ (e.g., applied by the support platform 40) are unknown, thereby making it difficult to compare the relative values of the first plurality of poses to the second plurality of poses. Accordingly, aspects of embodiments of the present disclosure relate to computing an estimate of the rigid transformation $T_{S_1S_2}$.

In operation 240, the characterization system 100 computes a coarse scene transformation $T_{coarse}$ between the first scene $S_1$ and the second scene $S_2$. In some embodiments of the present disclosure, a distinctive marker or fiducial 30 is included with the arrangement 20 of objects 22 and appears in both the first scene $S_1$ and the second scene $S_2$, where the fiducial 30 is rigidly transformed together with the arrangement 20 of objects 22, such that the physical relationship between the fiducial 30 and the objects 22 is maintained through the transformation, thereby enabling the fiducial 30 to provide a reference for computing the coarse scene transformation $T_{coarse}$. In the embodiments shown in FIGS. 1 and 3, a ChArUco board is used as the fiducial 30 and is placed next to the arrangement 20 of objects 22. Generally, a ChArUco board is a checkerboard pattern with black or dark squares in the four corners and ArUco markers (or other markers) in the white squares. Each ArUco marker in the ChArUco board has a different pattern that encodes a different identifier. Accordingly, a computer vision system can detect the pose of the ChArUco board in an image based on the positions and arrangements of the individual ArUco markers within the board. By computing the poses $T_{S_1C}$ and $T_{S_2C}$ of the ChArUco board from images of the ChArUco board before and after applying a rigid transform, respectively, the characterization system 100 according to some embodiments of the present disclosure computes a coarse scene transformation $T_{coarse}$ from the first scene $S_1$ to the second scene $S_2$:

$$T_{coarse} = T_{S_1C} T_{S_2C}^{-1} \qquad (7)$$

In some embodiments of the present disclosure, other types of fiducials 30 are placed in the scene and used to compute the coarse scene transformation, such as a grid of ArUco markers (e.g., without the checkerboard), augmented reality tags (ARTag), AprilTags, one or more rulers, one or more protractors, and the like.

In various other embodiments of the present disclosure, other techniques may be used to compute a coarse scene transformation. For example, in embodiments of the present disclosure where the support platform 40 can be controlled at high precision, the coarse scene transformation may be computed based on the known transformation applied by the support platform 40. As another example, a coarse scene transformation may be computed based on treating the points poses as point clouds (e.g., considering the positions only) and registering or aligning the point clouds (e.g., by applying an iterative closest point algorithm). As a further example, the two poses can be matched using a graph matching approach. The pose estimator 10 computes a 3-D connected graph from each component in the set of poses of $S_1$ to each other component in the set of poses of $S_2$. Then the pose estimator computes a feature vector for each element in $S_1$ and each element in $S_2$ using the relative transformation (R and T) between itself and its closest neighbors (e.g., its five closest neighbors). These relative transformations are then used to compute correspondences between $S_1$ and $S_2$ (e.g., finding poses in $S_1$ and $S_2$ that have similar relative transformations to its closest neighbors). After finding correspondences between poses in $S_1$ and poses in $S_2$, the pose estimator 10 computes one or more 3-D rigid body transform estimations using, for example, random sample consensus (RANSAC) where inliers are defined as correspondences less than a threshold distance (e.g., 3 mm). The estimated rigid body transform with the most inliers could be used as $T_{coarse}$.

In operation 250, the characterization system 100 matches corresponding ones of the first poses in $\{P_{S_1}^1, P_{S_1}^2, \ldots, P_{S_1}^i, \ldots, P_{S_1}^n\}$ of the objects in first scene $S_1$ with the second plurality of estimated poses $\{Q_{S_2}^1, Q_{S_2}^2, \ldots, Q_{S_3}^i, \ldots, Q_{S_4}^n\}$ of the same objects in second scene $S_2$. FIG. 3 is a schematic depiction of the rigid transformation of an arrangement of objects in a first scene with respect to a pose estimation system to form a second scene with respect to the pose estimation system, including depictions of the estimated poses $P_{S_1}$ of objects in the arrangement in a first scene $S_1$ and the estimated poses $Q_{S_2}$ of objects in the arrangement in a second scene $S_2$. FIG. 3 depicts arrows with dotted lines from some of the objects 22 in the first scene $S_1$ to corresponding objects 22 in the second scene $S_2$ (e.g., matching up the different views of the same objects in the different scenes). In the arrangement shown in FIG. 3, the first estimated poses $P_{S_1}$ computed by the pose estimation system 10 for the first scene $S_1$ are depicted as triangles with diagonal striped shading, and the second estimated poses $Q_{S_2}$ are depicted as triangles with dotted shading, where the centers of the triangles are aligned with the estimated centroids of their corresponding objects, and the angle of rotation of the triangle indicates (in the two dimensional constraints of the page) the estimated rotational pose of the corresponding objects.

Figure 4:
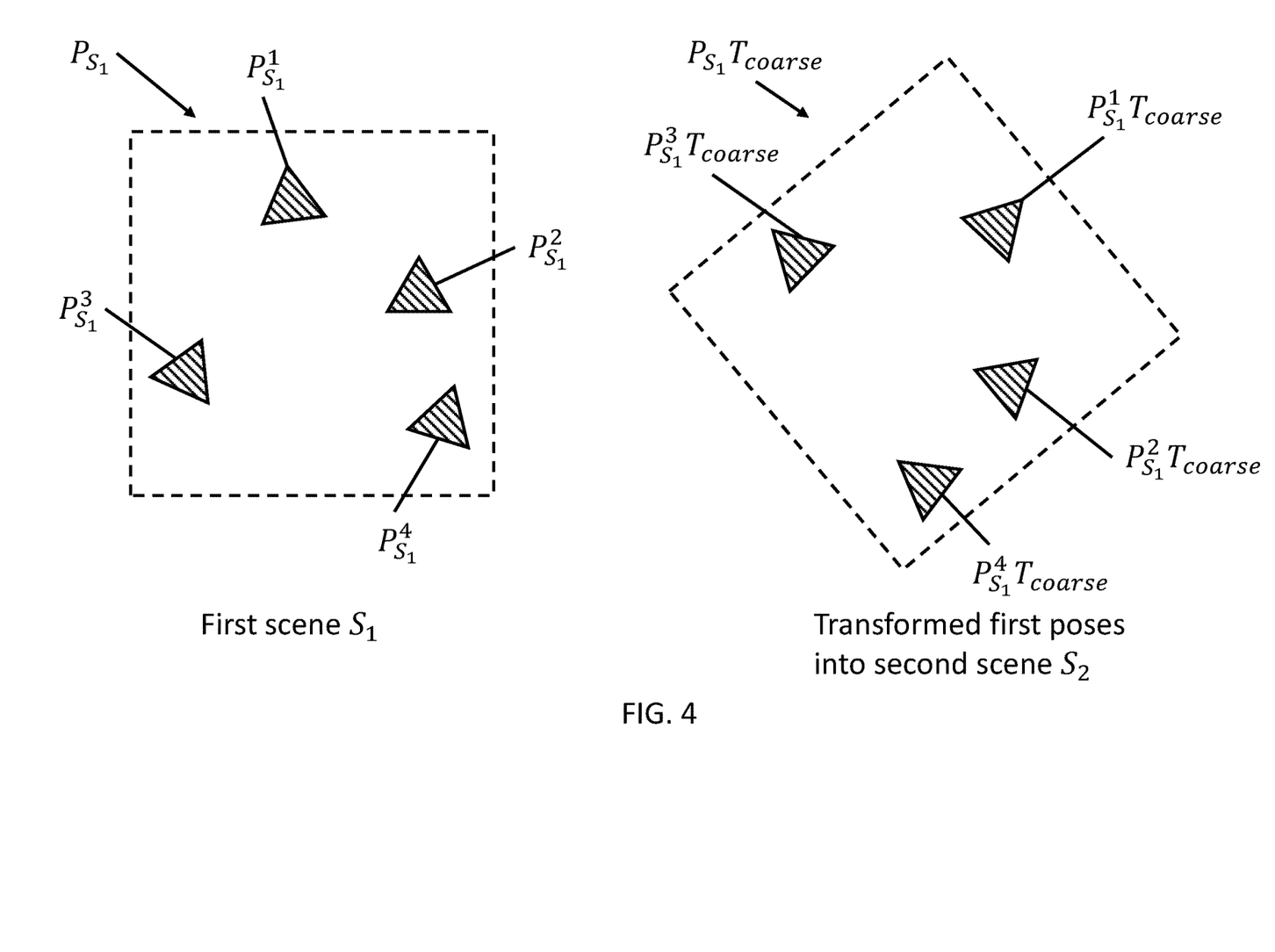
FIG. 4 is a schematic depiction of the transformation of the first poses $P_{S_1} = \{P_{S_1}^1, P_{S_1}^2, P_{S_1}^3, P_{S_1}^4\}$ in accordance with the coarse scene transform $T_{coarse}$ to compute transformed first poses $P_{S_2}$ in second scene $S_2$: $P_{S_2} = \{P_{S_1}^1 T_{coarse}, P_{S_1}^2 T_{coarse}, P_{S_1}^3 T_{coarse}, P_{S_1}^4 T_{coarse}\}$ in accordance with one embodiment of the present disclosure.

In some embodiments of the present disclosure, the characterization system 100 performs the matching between the first poses in $\{P_{S_1}^1, P_{S_1}^2, \ldots, P_{S_1}^i, \ldots, P_{S_1}^n\}$ of the objects in first scene $S_1$ with the second plurality of estimated poses $\{Q_{S_2}^1, Q_{S_2}^2, \ldots, Q_{S_3}^i, \ldots, Q_{S_4}^n\}$ of the same objects in second scene $S_2$ based on a greedy search. In such embodiments, the centroids of the visible objects in the first scene $S_1$, as represented by their poses $\{P_{S_1}^1, P_{S_1}^2, \ldots, P_{S_1}^i, \ldots, P_{S_1}^n\}$, are transformed based on the coarse scene transformation $T_{coarse}$ and matched with the second poses $\{Q_{S_2}^1, Q_{S_2}^2, \ldots, Q_{S_3}^i, \ldots, Q_{S_4}^n\}$ in the second scene $S_2$. FIG. 4 is a schematic depiction of the transformation of the first poses $\{P_{S_1} = P_{S_1}^1, P_{S_1}^2, P_{S_1}^3, P_{S_1}^4\}$ in accordance with the coarse scene transformation $T_{coarse}$ to compute coarsely transformed first poses $P_{S_2}$ in second scene $S_2$:

$$P_{S_2} = \{P_{S_1}^1 T_{coarse}, P_{S_1}^2 T_{coarse}, P_{S_1}^3 T_{coarse}, P_{S_1}^4 T_{coarse}\}$$

in accordance with one embodiment of the present disclosure.

Figure 5:
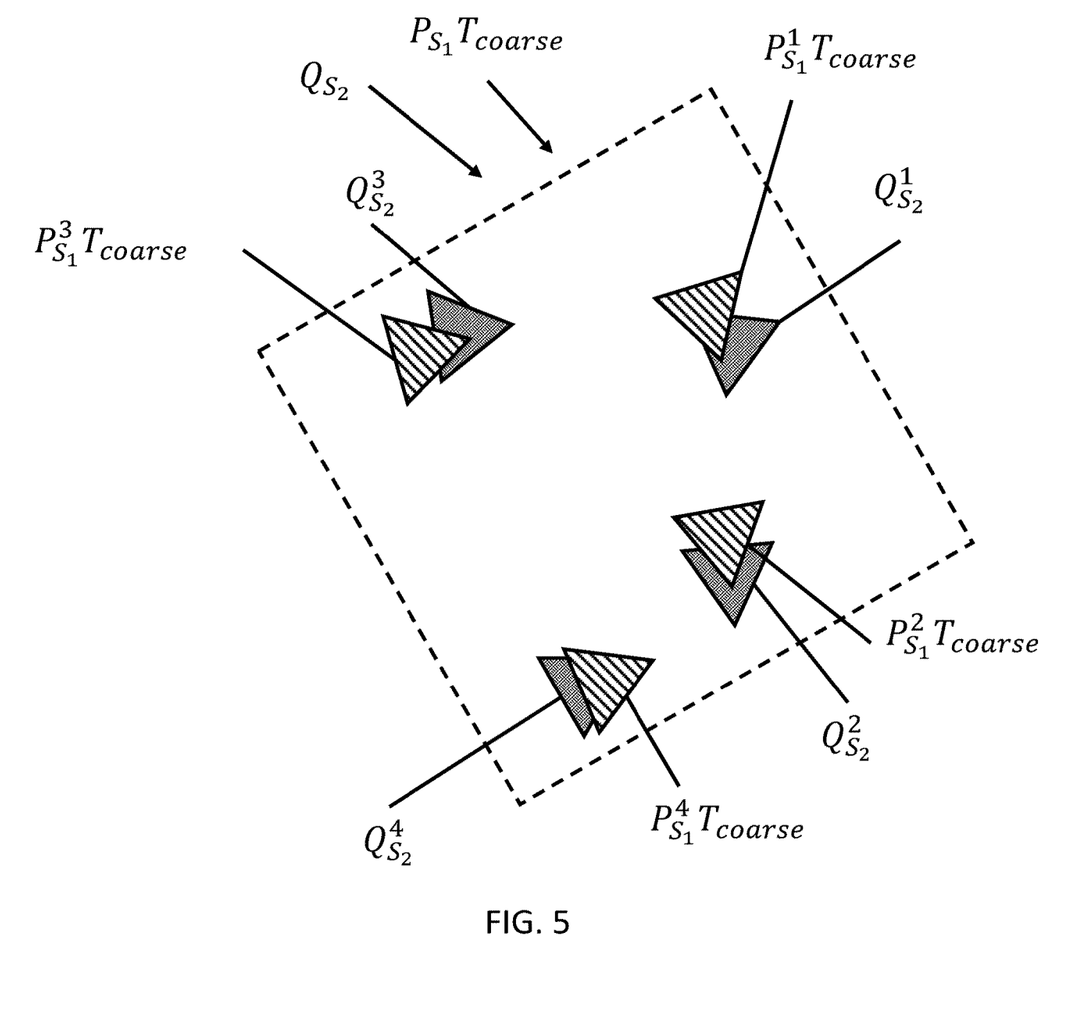
FIG. 5 is a schematic depiction of the overlay of the coarsely transformed first poses $P_{S_2}$ onto the second poses $Q_{S_2}$ in accordance with one embodiment of the present disclosure.

FIG. 5 is a schematic depiction of the overlay of the coarsely transformed first poses $P_{S_2}$ onto the second poses $Q_{S_2}$ in accordance with one embodiment of the present disclosure. In the example shown in FIG. 5, the coarsely transformed first poses $P_{S_2} T_{coarse}$ are close in location to corresponding ones of the second poses $Q_{S_2}$.

For example, for each coarsely transformed first pose $P_{S_1}^i T_{coarse}$, find the closest second pose $Q_{S_3}^j$ based on position, where the greedy search searches through different pairings of the first poses with the second poses to minimize the overall error (e.g., sum of the differences in position between the coarsely transformed first poses and the second poses). In more detail, in some embodiments, the pose estimator 10 constructs a cost matrix of size N×M where N is number of poses in scene 1 ($S_1$) and j ... M is number of poses in scene 2 ($S_2$), and where each element of the cost matrix is the centroid difference between each pose. The pose estimator 10 then performs a linear sum assignment to determine the optimal matches.

In some embodiments of the present disclosure, the characterization system 100 performs the matching between the first poses in $\{P_{S_1}^1, P_{S_1}^2, \ldots, P_{S_1}^i, \ldots, P_{S_1}^n\}$ of the objects in first scene $S_1$ with the second plurality of estimated poses $\{Q_{S_2}^1, Q_{S_2}^2, \ldots, Q_{S_3}^i, \ldots, Q_{S_4}^n\}$ of the same objects in second scene $S_2$ based on maximal matching in a bipartite graph problem, where edges connect the estimated poses $\{Q_{S_2}^1, Q_{S_2}^2, \ldots, Q_{S_3}^i, \ldots, Q_{S_4}^n\}$ in the first scene $S_1$ transformed to the second scene $S_2$ using the coarse scene transformation $T_{coarse}$, with matchable estimated poses selected from the second poses $\{Q_{S_2}^1, Q_{S_2}^2, \ldots, Q_{S_3}^i, \ldots, Q_{S_4}^n\}$ in the second scene $S_2$. An estimated pose is considered correctly matched if the resulting matching includes an edge connecting the pose of an object in the first scene $S_1$ with a corresponding pose in the second scene $S_2$.

In some embodiments of the present disclosure, there may be mismatches in the poses. For example, the pose estimation system 10 may estimate poses for a different number of objects in the first scene $S_1$ versus the second scene $S_2$ or estimate poses for different objects (e.g., five objects A, B, C, D, and E in the first scene $S_1$ and five objects A, B, D, E, and F in the second scene $S_2$). These differences may be due, for example, to noise or instability in the pose estimation system 10 or asymmetries in the performance of the pose estimation system 10.

In some embodiments of the present disclosure, instead of using a greedy search to perform matching of poses, a false-positive threshold approach is applied instead to match coarsely transformed first poses $P_{S_2}$ with second poses $Q_{S_2}$. In more detail, for each pose $p_{S_2}$ of the coarsely transformed first poses $P_{S_2}$, the characterization system 100 identifies a closest pose $q_{S_2}$ of the second poses $Q_{S_2}$. If the closest pose $q_{S_2}$ of the second poses $Q_{S_2}$ is less than a false-positive threshold distance (e.g., 3 millimeters) away from the current pose $p_{S_2}$ of the coarsely transformed first poses $P_{S_2}$ (e.g., where the poses are located at the centroids of the corresponding objects), then that closest second pose $q_{S_2}$ is treated as a match or a corresponding pose. If the closest second pose $q_{S_2}$ is more than the false-positive threshold distance away, then those poses are treated as outliers and not counted among the matching poses for purposes of refining the transformation. In another embodiment of the present disclosure, instead of comparing the distances of the centroids, the CAD models corresponding to the objects are placed and oriented in accordance with their computed poses, The volume of the intersection of the two CAD models (for the coarsely transformed first pose $p_{S_2}$ and the closest second pose $q_{S_2}$) is then divided by the volume of a single one of the CAD models (or divided by the volume of the union of the two CAD models, in accordance with an intersection-over-union metric). In the case of perfect measurements of the poses, the quotient is 1, and where the CAD models do not align at all, then the quotient is 0. Accordingly, in some embodiments, a false-positive threshold may be set based on an intersection metric (e.g., intersection over a single instance or intersection over union) where an intersection metric exceeding the false-positive threshold intersection (e.g., where the intersection metric is a value greater than 0.80) is determined to satisfy the threshold for determining that the coarsely transformed first pose $p_{S_2}$ and the closest second pose $q_{S_2}$ match.

After performing the matching, it is assumed that first pose $N_1$ and second pose $Q_{S_3}^i$ refer to the same object i in the first scene $S_1$ and the second scene $S_2$, respectively.

In operation 260, the characterization system 100 computes a refined scene transform $T_{S_1 S_2}$ from first scene $S_1$ to second scene $S_2$, starting from the coarse scene transformation $T_{coarse}$ (e.g., initially setting $T_{current} = T_{coarse}$), where the refinement of the current rigid transformation $T_{current}$ is based on improving the alignment of the transformed first poses with their corresponding matching second poses, as computed in operation 250. In more detail, some aspects of embodiments of the present disclosure relate to refining the transform by minimizing the below cost function for all of the matched poses ($P_{S_1}^i$, $Q_{S_3}^i$):

$$\min_{T_{S_1 S_2}} \frac{1}{n} \sum_{i,j} \| P_{S_1}^i T_{S_1 S_2} x_j - Q_{S_3}^i x_j \| \tag{8}$$

where $x_j$ is a predefined set of points (e.g., [0,0,1], [0,1,0], and [1,0,0], although embodiments of the present disclosure are not limited thereto). If the points are set to [0,0,0], then this function is equivalent to a 3-D rigid body transform.

For example, referring back to FIG. 5, the positions and orientations of the transformed first poses $P_{S_1} T_{coarse}$ are close to the second poses $Q_{S_2}$, but do not align exactly with the second poses. The differences in positions of these poses are represented in the above cost function (8) by the difference: $P_{S_1}^i T_{S_1 S_2} x_j - Q_{S_3}^i x_j$.

In some embodiments of the present disclosure, the refinement process is an iterative operation (such as by applying gradient descent) to update the current rigid transformation $T_{current}$ until the cost function is minimized (e.g., until a threshold condition has been met, such as reaching a set number of iterations or where the improvement from one iteration to the next is less than a threshold value), at which point the updated value of $T_{current}$ is output as the refined scene transformation $T_{S_1 S_2}$.

Accordingly, in operation 260, the characterization system 100 computes a refined scene transformation $T_{S_1 S_2}$ by minimizing the cost function (e.g., error or differences between the poses of the objects as captured in the first scene $S_1$ and the second scene $S_2$.).

Figure 6:
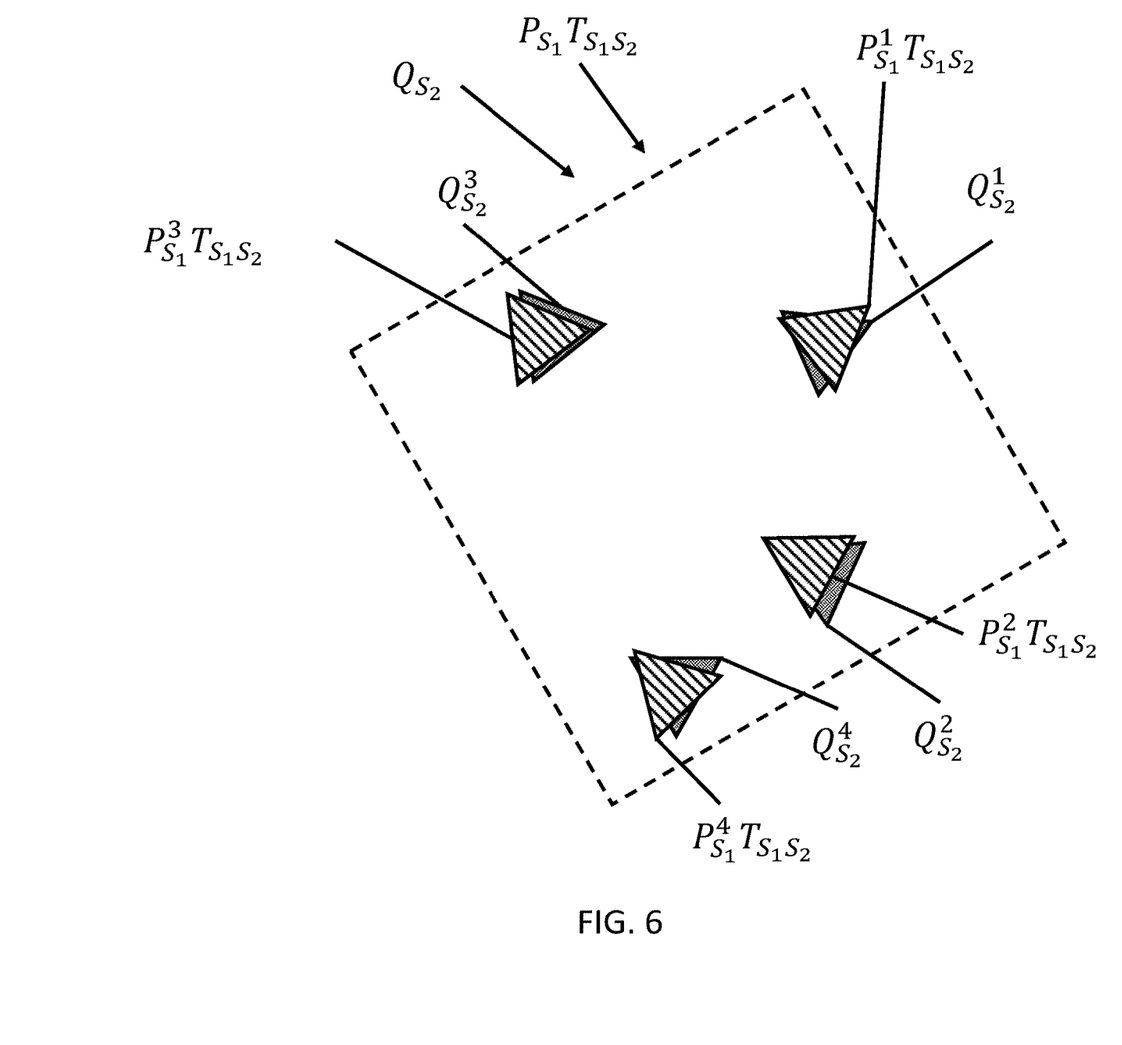
FIG. 6 is a schematic depiction in which the first poses $P_{S_1}$ are transformed by a refined scene transformation $T_{S_1 S_2}$ to produce transformed first poses $P_{S_1} T_{S_1 S_2}$ that are closer to their corresponding poses $Q_{S_2}$ than the coarsely transformed first poses $P_{S_1} T_{coarse}$ according to one embodiment of the present disclosure.

FIG. 6 is a schematic depiction in which the first poses $P_{S_1}$ are transformed by a refined scene transformation $T_{S_1 S_2}$ to produce transformed first poses (or finely transformed first poses) $P_{S_1} T_{S_1 S_2}$ that are closer to their corresponding poses $Q_{S_2}$ than the coarsely transformed first poses $P_{S_1} T_{coarse}$ according to one embodiment of the present disclosure. Note, however, that while the refined scene transformation $T_{S_1 S_2}$ brings the first poses closer to the second poses $Q_{S_2}$, some differences in the position and orientation of the poses remain. These remaining differences represent the pose errors, including translation and rotation errors, of the pose estimation system 10.

In operation 270, characterization system 100 characterizes the pose estimation system 100 based on the refined scene transformation $T_{S_1 S_2}$ and the computed first and second poses. In particular, after minimizing the cost function above to compute a refined scene transformation $T_{S_1 S_2}$ that minimizes the differences between the pose estimates of the arrangement 20 of objects 22 as depicted in the first scene $S_1$ and the second scene $S_2$, any remaining differences in the estimated poses are assumed to be the result of errors or inaccuracies caused by the pose estimation system 100 (e.g., based on the assumption that physical rigid transformation applied to the arrangement of objects did not cause any shifts in the relative positions of the objects). More formally, the errors may be calculated in accordance with Equations (1) and (2), where the refined scene transformation $T_{S_1 S_2}$ represents the rigid transformation applied to the first poses $\{P_{S_1}^1, P_{S_1}^2, \ldots, P_{S_1}^i, \ldots, P_{S_1}^n\}$ from the first scene $S_1$ to the second poses $\{Q_{S_2}^1, Q_{S_2}^2, \ldots, Q_{S_3}^i, \ldots, Q_{S_4}^n\}$ from the second scene $S_2$:

$$(P_{S_1}^T{}_{S_1 S_2})P_{err} = Q_{S_2} \tag{9}$$

$$P_{err} = (P_{S_1} T_{S_1 S_2})^{-1} Q_{S_2} \tag{10}$$

As such, following the approach of equations (3) and (4), the rotation error $R_{err}$ and translation error $T_{err}$ characterizing the error of a pose estimation system 10 may be computed as:

$$R_{err} = \frac{1}{n} \sum_i \left\| R\left((P_{S_1}^i T_{S_1 S_2})^{-1} Q_{S_2}^i\right) \right\| \tag{11}$$

$$T_{err} = \frac{1}{n} \sum_i \left\| T\left((P_{S_1}^i T_{S_1 S_2})^{-1} Q_{S_2}^i\right) \right\| \tag{12}$$

where, as above, the function R( ) converts its argument into an axis-angle where the magnitude is the rotation difference, and the function T( ) extracts the translation component of the pose matrix from its argument. In particular:

$$R((P_{S_1}^i T_{S_1 S_2})^{-1} Q_{S_2}^i) = \cos^{-1}(\text{Tr}(R_{PS_2}^i \cdot (R_{PS_2}^i)^{-1}) - 1)/2 \tag{13}$$

$$T((P_{S_1}^i T_{S_1 S_2})^{-1} Q_{S_2}^i) = \| T_{QS_2}^i - T_{PS_2}^i \| \tag{14}$$

In the example shown in FIG. 6, pose pairings $(P_{S_1}^1 T_{S_1 S_2}, Q_{S_2}^1)$ and $(P_{S_1}^4 T_{S_1 S_2}, Q_{S_2}^4)$ exhibit greater rotation error $R_{err}$, while pose pairings $(P_{S_1}^2 T_{S_1 S_2}, Q_{S_2}^2)$ and $(P_{S_1}^3 T_{S_1 S_2}, Q_{S_2}^3)$ exhibit greater translation error $T_{err}$.

This procedure can be repeated across multiple pairs of scenes (e.g., multiple different arrangements of different objects, where the arrangements are rigidly transformed to produce pairs of scenes) to compute a variance, maximum, and expected value for the various pose error measurements for a particular pose estimation system. These values then allow the performance of different pose estimation systems to be compared against one another.

In some experiments with approaches in accordance with embodiments of the present disclosure, a pose characterization system was used to accurately predict pose errors made by pose estimators to a precision of less than equal to 30 microns in translation error $T_{err}$ and less than or equal to 0.3 degrees in rotational error $R_{err}$. This enables the evaluation of whether such pose estimation systems are capable of performing to particular high-precision design constraints, such as a desired precision of less than 200 microns of translation error and less than 1 degree of rotation error at a distance of approximately 1 meter, whereas such high-precision measurements of the error characterization of pose estimation systems may otherwise have been impossible or expensive to implement.

As such, aspects of embodiments of the present disclosure provide systems and methods for characterizing the performance (e.g., accuracy and precision) of pose estimation systems at a high level of precision without relying on an external source of ground truth.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for characterizing a pose estimation system, comprising:
   receiving, from a pose estimation system, by a characterization system comprising a processor and a memory, a first plurality of poses of an arrangement of objects in a first scene;
   receiving, from the pose estimation system, by the characterization system, a second plurality of poses of the arrangement of objects in a second scene, the second scene being a rigid transformation of the arrangement of objects of the first scene with respect to the pose estimation system;
   computing, by the characterization system, a coarse scene transformation between the first scene and the second scene;
   matching, by the characterization system, corresponding poses between the first plurality of poses and the second plurality of poses;
   computing, by the characterization system, a refined scene transformation between the first scene and the second scene based on coarse scene transformation, the first poses, and the second poses;
   transforming, by the characterization system, the first plurality of poses based on the refined scene transformation to compute a plurality of transformed first poses; and computing an average rotation error and an average translation error of the pose estimation system based on differences between the transformed first poses and the second plurality of poses
   wherein the matching the corresponding poses between the first plurality of poses and the second plurality of poses is performed by:
   transforming the first plurality of poses in accordance with the coarse scene transformation to compute a plurality of coarsely transformed first poses; and
   for each coarsely transformed first pose of the first coarsely transformed first poses:
      identifying a second pose of the second poses closest to the coarsely transformed first pose;
      identifying a type of an object corresponding to the coarsely transformed first pose and the second pose;
      positioning a first 3-D model of the type of the object at the coarsely transformed first pose;
      positioning a second 3-D model of the type of the object at the second pose; and
      determining that the coarsely transformed first pose and the second pose closest to the coarsely transformed first pose match when an intersection between the positioned first 3-D model and the positioned second 3-D model satisfies a false-positive threshold intersection.

2. A method for characterizing a pose estimation system, comprising:
   receiving, from a pose estimation system, by a characterization system comprising a processor and a memory, a first plurality of poses of an arrangement of objects in a first scene;
   receiving, from the pose estimation system, by the characterization system, a second plurality of poses of the arrangement of objects in a second scene, the second scene being a rigid transformation of the arrangement of objects of the first scene with respect to the pose estimation system;
   computing, by the characterization system, a coarse scene transformation between the first scene and the second scene;
   matching, by the characterization system, corresponding poses between the first plurality of poses and the second plurality of poses;
   computing, by the characterization system, a refined scene transformation between the first scene and the second scene based on coarse scene transformation, the first poses, and the second poses;
   transforming, by the characterization system, the first plurality of poses based on the refined scene transformation to compute a plurality of transformed first poses; and
   computing an average rotation error and an average translation error of the pose estimation system based on differences between the transformed first poses and the second plurality of poses,
   wherein the average rotation error is computed based on a sum of the rotation errors between the differences between rotational components of the transformed first poses and the second plurality of poses, and
   wherein the average translation error is computed based on a sum of the translation errors between the differences between translation components of the transformed first poses and the second plurality of poses,
   wherein the average rotation error $R_{err}$ is computed in accordance with:

$$R_{err} = \frac{1}{n}\sum_{i} \left\| R\left(\left(P_{S_1}^i T_{S_1 S_2}\right)^{-1} Q_{S_2}^i\right) \right\|,$$

and
   wherein the average translation error $T_{err}$ is computed in accordance with:

$$T_{err} = \frac{1}{n}\sum_{i} \left\| T\left(\left(P_{S_1}^i T_{S_1 S_2}\right)^{-1} Q_{S_2}^i\right) \right\|,$$

where $P_{S_1}^i$ an i-th pose of the first poses, $Q_{S_2}^i$ is an i-th pose of the second poses, $T_{S_1 S_2}$ is the refined scene transformation from the first scene $S_1$ to the second scene $S_2$, and n is the number of first poses and the number of second poses.

3. A system for characterizing a pose estimation system, comprising:
   a processor; and
   a memory storing instructions that, when executed by the processor, cause the processor to:
      receive, from a pose estimation system, a first plurality of poses of an arrangement of objects in a first scene;
      receive, from the pose estimation system, a second plurality of poses of the arrangement of objects in a second scene, the second scene being a rigid transformation of the arrangement of objects of the first scene with respect to the pose estimation system;
      compute a coarse scene transformation between the first scene and the second scene;
      match corresponding poses between the first plurality of poses and the second plurality of poses;
      compute a refined scene transformation between the first scene and the second scene based on coarse scene transformation, the first poses, and the second poses;
      transform the first plurality of poses based on the refined scene transformation to compute a plurality of transformed first poses; and
      compute an average rotation error and an average translation error of the pose estimation system based on differences between the transformed first poses and the second plurality of poses,
   wherein the memory further stores instructions that, when executed by the processor, cause the processor to match the corresponding poses between the first plurality of poses and the second plurality of poses by:
   transforming the first plurality of poses in accordance with the coarse scene transformation to compute a plurality of transformed first poses; and
   for each transformed first pose of the first transformed first poses:
      identifying a second pose of the second poses closest to the transformed first pose;
      identifying a type of an object corresponding to the transformed first pose and the second pose;
      positioning a first 3-D model of the type of the object at the transformed first pose;
      positioning a second 3-D model of the type of the object at the second pose; and
      determining that the transformed first pose and the second pose closest to the transformed first pose match when an intersection between the positioned first 3-D model and the positioned second 3-D model satisfies a false-positive threshold intersection.

4. A system for characterizing a pose estimation system, comprising:
a processor; and
a memory storing instructions that, when executed by the processor, cause the processor to:
receive, from a pose estimation system, a first plurality of poses of an arrangement of objects in a first scene;
receive, from the pose estimation system, a second plurality of poses of the arrangement of objects in a second scene, the second scene being a rigid transformation of the arrangement of objects of the first scene with respect to the pose estimation system;
compute a coarse scene transformation between the first scene and the second scene;
match corresponding poses between the first plurality of poses and the second plurality of poses;
compute a refined scene transformation between the first scene and the second scene based on coarse scene transformation, the first poses, and the second poses;
transform the first plurality of poses based on the refined scene transformation to compute a plurality of transformed first poses; and
compute an average rotation error and an average translation error of the pose estimation system based on differences between the transformed first poses and the second plurality of poses,
wherein the memory further stores instructions that, when executed by the processor, cause the processor to:
compute the average rotation error based on a sum of the rotation errors between the differences between rotational components of the transformed first poses and the second plurality of poses, and
compute the average translation error based on a sum of the translation errors between the differences between translation components of the transformed first poses and the second plurality of poses,
wherein the average rotation error $R_{err}$ is computed in accordance with:

$$R_{err} = \frac{1}{n}\sum_{i} \left\| R\left( (P^i_{S_1} T_{S_1 S_2})^{-1} Q^i_{S_2} \right) \right\|,$$

and
wherein the average translation error $T_{err}$ is computed in accordance with:

$$T_{err} = \frac{1}{n}\sum_{i} \left\| T\left( (P^i_{S_1} T_{S_1 S_2})^{-1} Q^i_{S_2} \right) \right\|,$$

where $P_{S_1}^i$ is an i-th pose of the first poses, $Q_{S_2}^i$ is an i-th pose of the second poses, $T_{S_1 S_2}$ is the refined scene transformation from the first scene $S_1$ to the second scene $S_2$, and n is the number of first poses and the number of second poses.

* * * * *